Dec. 2, 1924.
G. C. DEBAY
1,517,713
BUILDING BLOCK MOLDING MACHINE
Filed May 25, 1921   3 Sheets-Sheet 1
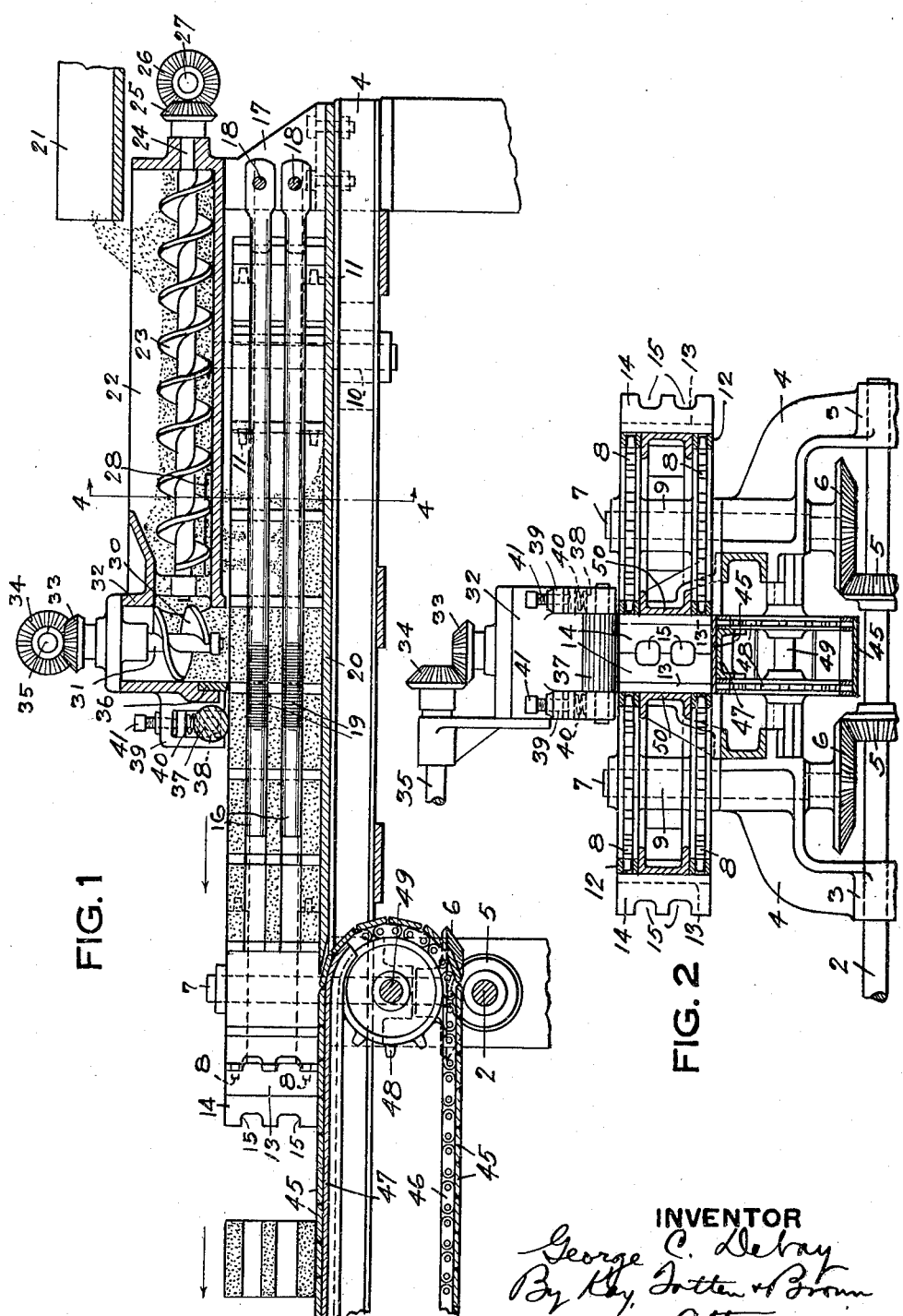
INVENTOR
George C. Debay
By Kay, Totten & Brown
Attorneys Dec. 2, 1924.
G. C. DEBAY
1,517,713
BUILDING BLOCK MOLDING MACHINE
Filed May 25, 1921   3 Sheets-Sheet 3
FIG. 4
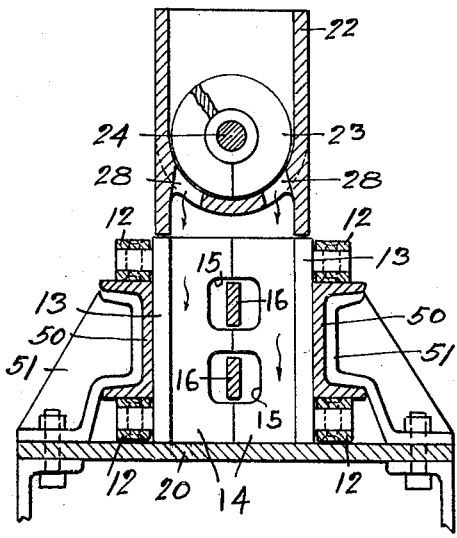
FIG. 6
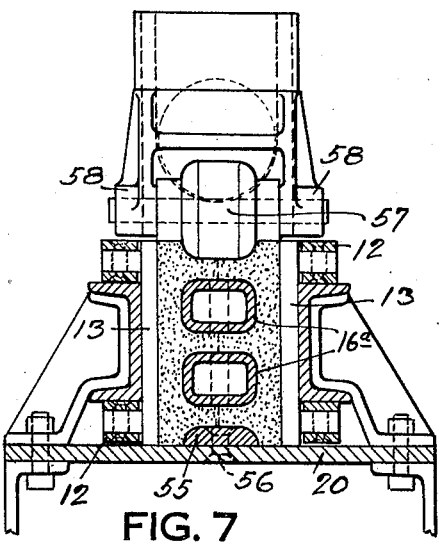
FIG. 7
FIG. 8
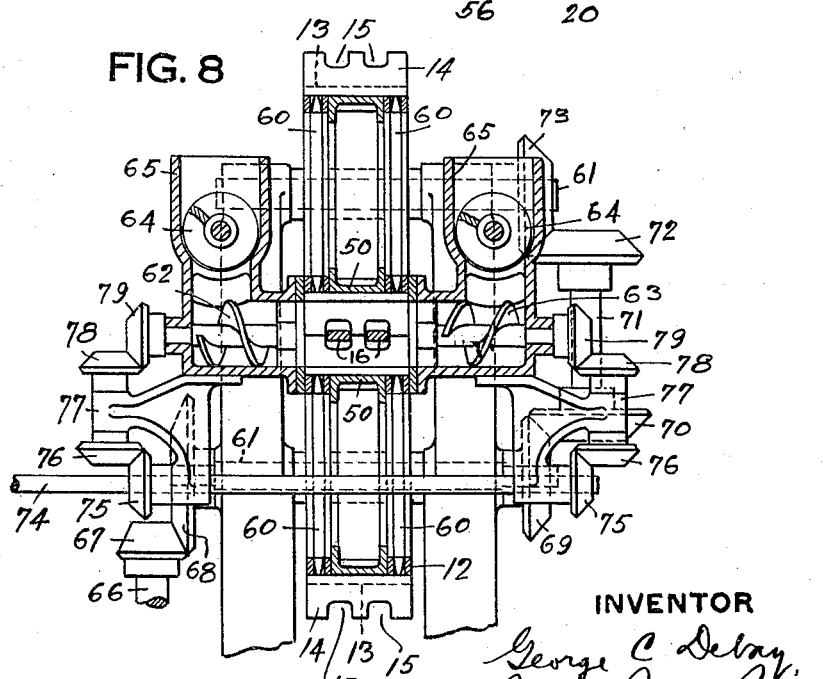
INVENTOR
George C. Debay.
By Ray, Totten & Brown
Attorneys Patented Dec. 2, 1924.

1,517,713

UNITED STATES PATENT OFFICE.

GEORGE C. DEBAY, OF SPRINGDALE, PENNSYLVANIA.

BUILDING-BLOCK-MOLDING MACHINE.

Application filed May 25, 1921. Serial No. 472,318.

*To all whom it may concern:*

Be it known that I, GEORGE C. DEBAY, a citizen of the United States, and resident of Springdale, in the county of Allegheny and State of Pennsylvania, have invented a new and useful Improvement in Building-Block-Molding Machines; and I do hereby declare the following to be a full, clear, and exact description thereof.

My invention relates to the manufacture of building blocks and has special reference to machines for making blocks from plastic material with air spaces or openings formed therein.

The object of my invention is to provide a machine of this character in which the block shall be formed accurately with great rapidity and at reduced cost.

In Letters Patent No. 1,362,928 granted to me December 21, 1920, I have described and claimed a machine for making building blocks in which a series of mold sections are carried by a pair of endless chains which travel lengthwise with respect to a pair of stationary core members, the movable sections being caused to close over the core members to form the molds which are thereafter filled with plastic molding material and compacted by means of suitable compressors.

Figure 3:
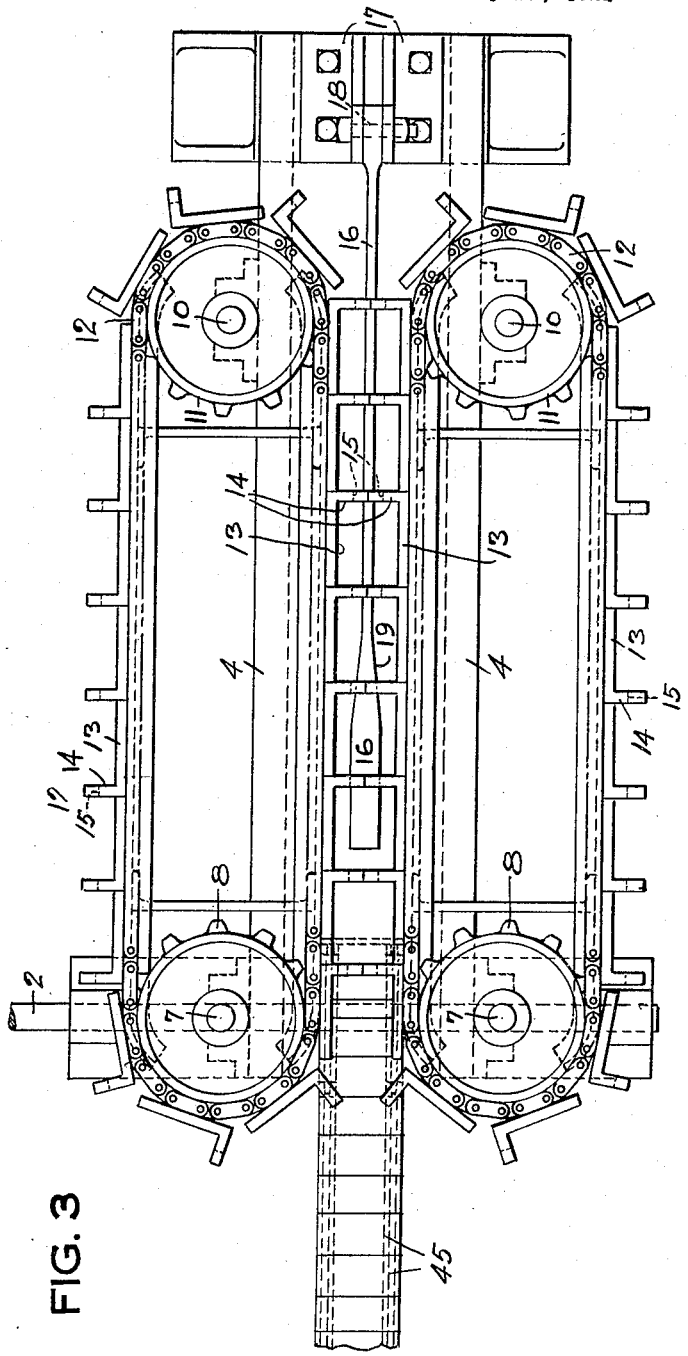
Figure 5:
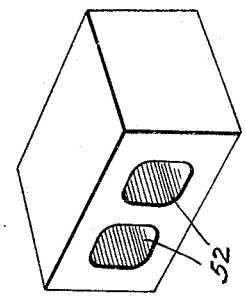

The machine which forms the subject of my present application resembles the machine of my prior patent in that a series of molds composed of separable sections is caused to move continuously past a source of plastic material and lengthwise with respect to a set of core bars. In the present machine, however, the mold sections are carried on two endless chains having parallel runs adjacent to each other on opposite sides of the core members, each chain carrying half of each mold and the two halves of each mold being thus brought into engagement around the core members at one end of the machine and traveling together along the core members and beneath the feeding and compacting means. Thereafter, the mold sections are separated to discharge the finished blocks which are carried away either by hand or by suitable conveying means. The two cooperating endless chains may be arranged either side by side or one above the other, both of these modifications being shown in the accompanying drawings, in which Fig. 1 is a longitudinal vertical sectional view taken centrally through a machine in which the endless chains are arranged side by side and the plastic material is fed vertically into the molds; Fig. 2 is an end view of the machine shown in Fig. 1; Fig. 3 is a top plan view of the same machine; Fig. 4 is a vertical cross sectional view taken substantially on the line 4—4, Fig. 1; Fig. 5 is a perspective view of one of the blocks made on the machine shown in Figs. 1 to 4; Fig. 6 is a vertical cross sectional view showing means for making a modified form of block; Fig. 7 is a fragmentary view of a portion of the base plate shown in Fig. 6; and Fig. 8 is an end view, partly in elevation and partly in section, showing a modified arrangement in which the chains carrying the mold sections are arranged one above the other.

Referring to Figs. 1 to 4, the numeral 2 designates a driving shaft mounted in bearings 3 in a frame 4, and driven from any suitable source of power, not shown. The shaft 2, as best shown in Fig. 2, carries a pair of bevel pinions 5 which mesh with bevel gear wheels 6 carried at the lower end of vertical shafts 7, to each of which is secured near its upper end a pair of spaced sprocket wheels 8 separated by means of suitable spacing collars 9. The frame 4 also carries short vertical shafts 10 to which are secured two pairs of spaced sprocket wheels 11, similar to the sprocket wheels 8. Endless chains 12 extend around the sprocket wheels 8 and 11, as best shown in Fig. 3, and each pair of these chains carries a series of L-shaped mold sections, each of which has a long portion 13 carried by one of the links of the endless chains and a short portion 14 having openings 15, corresponding in number and size to the openings required in the finished blocks.

Between the adjacent and parallel runs of the chains 12 is a set of stationary core members 16, each of which is secured to a standard 17 on the frame 4 by means of a bolt 18. The core members extend through the openings 15 in the mold sections and are supported by the mold sections which travel along the cores. These core members may be of uniform diameter from end to end, or, as shown at 19 in Figs. 1 and 3, may be tapered to assist in compacting the plastic material after it is placed in the molds. It will thus be seen that an endless series of molds is provided, each being composed of two matching half sections and resting on the base plate 20 which forms the bottom of each mold passing over it.

The apparatus for feeding plastic material into the molds is best shown in Fig. 1 and comprises a suitable source of plastic material, indicated diagrammatically by the chute 21, from which the material falls into a trough 22 containing a feed screw 23 carried by a shaft 24 that is driven by means of miter gears 25 and 26, the gear 26 being carried by a shaft 27 driven from any suitable source of power, not shown. The molding material is carried forward by the feed screw 23 and a portion of it falls into the molds through slots 28 shown in Figs. 1 and 4, thus partially filling each mold as it approaches the main feeding point, which is adjacent to the tapering portions 19 of the core members 16. The feeding and compacting of the plastic material at this point is produced by means of a vertical feed screw 30 carried by a shaft 31 which is mounted in suitable bearings in a housing 32 and carries a miter gear 33 meshing with another miter gear 34 carried by a shaft 35 which is driven from any suitable source of power. A scraper 36 is carried by the housing 32 and serves to approximately level off the material at the tops of the filled molds as they pass beneath it.

Immediately beyond the housing 32 is a roller 37 which smooths the upper surfaces of the blocks and cooperates with the enlarged portions of the core member 16 to give the blocks a further compression. The roller 37 is mounted in bearings 38 in supports 39 which project from the housings 32 and is yieldingly forced downward by means of springs 40, the tension of which is adjusted by means of screws 41.

Adjacent to the base or table 20 of the machine, as shown at the left of Fig. 1, is an endless receiving conveyer composed of transverse strips 45 carried by endless chains 46 and traveling upon a horizontal guide 47. The chains 46 extend around sprocket wheels 48 that are secured to a shaft 49 which, as shown, is an idle shaft but which may be driven from the main power shaft 2 by suitable power connections. The conveyer is preferably driven at a speed somewhat greater than the speed at which the blocks advance past the core members, in order that each finished block may be drawn quickly away from its mold before the mold sections turn away from each other to any great extent in passing around the sprocket wheels 8.

In their passage along the core members 16 the mold sections are confined between vertical side walls 50 which, as shown in Fig. 4, are channel bars supported by means of brackets 51 a sufficient distance above the base 20 to enable the lower chains 12 to pass beneath the channel bars.

The machine shown in Figs. 1 to 4 produces a block of the form shown in Fig. 5, having two openings 52 formed by the stationary core members 16.

When it is desired to produce recesses in the tops and bottoms of the blocks the arrangement shown in Figs. 6 and 7 may be used. In this form of my machine a tapered strip 55 is secured to the base plate 20 by means of suitable rivets 56 or the like, this strip being preferably located with its tapering portion adjacent to the tapering portions of the core members 16ª which, as shown in Fig. 6, may be of tubular construction and properly shaped to produce the desired openings. A roller 57, which may be substituted for the roller 37 in Figs. 1 and 2 or may be an additional roller, is mounted in bearings 58 above the molds, and is so shaped as to form upper recesses in the blocks corresponding to the lower recesses produced by the strip 55. In this form of my machine the strip 55 and the roller 57 assist materially in compacting the blocks.

A further modification of my machine is shown in Fig. 8 and consists essentially in placing the chains which carry the mold sections one above the other instead of side by side as in Figs. 1 to 5. As shown in Fig. 8, the sprocket wheels 60 carrying the mold sections are mounted on horizontal shafts 61, and the molding material is fed into the molds from both sides by means of right-hand and left-hand feed screws 62 and 63, respectively, the plastic material being supplied to the feed screws 62 and 63 by means of horizontal feed screws 64 working in hoppers 65 similar to the hopper 22 in the modification first described above. Power for rotating the sprocket wheels 60 is derived from a power shaft 66 carrying at its upper end a bevel pinion 67 meshing with the bevel gear wheel 68 on the lower shaft 61 from which power is transmitted to the upper shaft 61 through miter gears 69 and 70, a short vertical shaft 71, and miter gear wheels 72 and 73, the latter gear wheel being carried by the upper shaft 61. The feed screws 62 and 63 are driven from a power shaft 74 through sets of miter gears 75 and 76, short vertical shafts carried in bearings 77 and upper sets of miter gears 78 and 79, the latter gears being keyed to the shafts of the feed screws 62 and 63.

In the operation of the machines shown in Figs. 1 to 5, the chains carrying the mold sections are set in motion so that the adjacent runs of these chains travel in the same direction and at equal speeds, thus producing an endless series of molds, the sides of which are formed by the mold sections and the bottom by the base plate 20. As each mold approaches the vertical feed screw 31 it receives a preliminary charge which trickles through the slots 28 in the trough 22. On reaching the feed screw 31 each mold receives its complete charge of plastic material and as the mold continues to advance, the material in the mold is forced outwardly by the tapering portions 19 of the core members 16. Each mold, as it passes beneath the scraper 36, is approximately leveled off and the top of the block is smoothed by means of the roller 37. Thereafter the continued movement of the mold sections draws the block away from the core member 16 and delivers the finished block to a delivery carrier 45 which carries the finished blocks to any suitable storage place.

The machine shown in Fig. 8 operates in substantially the same manner as the machine in Figs. 1 to 4, except that the machine is fed from two opposite sides of the mold instead of from one side only.

Machines constructed according to my present invention may be used in molding blocks from concrete, cinders, or any other plastic molding material that is capable of being fed in granular or semi-liquid condition. It is to be understood that the structural details which I have shown and described are illustrative only and that numerous changes may be made in the construction and arrangement of parts within the scope of the present claims.

I claim as my invention:

1. In apparatus for molding blocks, the combination of two endless conveyers having parallel runs adapted to move in the same direction and at equal speeds, mold sections carried by the said conveyers and cooperating to form an endless series of molds, means for feeding plastic material into the said molds, and a member extending between the adjacent runs of said conveyer and forming a wall for said molds.

2. In apparatus for molding blocks, the combination of two endless conveyers having parallel runs adapted to move in the same direction and at equal speeds, mold sections carried by the said conveyers and cooperating to form an endless series of molds having openings formed therein, a stationary core member extending between the said conveyers and through said openings, and means for feeding plastic material to the said molds.

3. In apparatus for molding blocks, the combination of two endless conveyers having parallel runs adapted to move in the same direction and at equal speeds, mold sections carried by the said conveyers, each mold section forming one side and half of one end of a complete mold, and a stationary core bar extending between the adjacent runs of the said conveyers and through openings in the ends of the said molds.

4. In apparatus for molding blocks, the combination of two endless conveyers having parallel runs adapted to move in the same direction and at equal speeds, mold sections carried by the said conveyers and cooperating to form an endless series of molds, and a stationary core bar extending between the adjacent runs of the said conveyers and through openings in the said molds, the said core bar being tapered to exert increasing outward pressure upon plastic material contained in the said molds.

5. In apparatus for molding blocks, the combination of a stationary base or table, two endless conveyers having parallel runs adapted to move on the same base in the same direction and at equal speeds, mold sections carried by the said conveyers and having coinciding openings, stationary side bars confining the said mold sections against outward movement, and a stationary core bar extending between the adjacent runs of the said conveyers and through the said coinciding openings in the said mold sections.

6. In apparatus for molding blocks, the combination of two endless horizontal conveyers carrying mold sections cooperating to form an endless series of molds, means for feeding molding material into the said molds, and an endless conveyer in line with the bottoms of said molds and adapted to receive finished blocks successively from the said molds.

7. In apparatus for molding blocks, the combination of means for advancing a series of molds, means for introducing a partial charge of molding material into each of the said molds, and means for thereafter filling the said molds with molding material and for compacting the said material therein.

8. In apparatus for molding blocks, the combination of means for advancing a series of molds, a feed hopper disposed above said molds and having openings for feeding a preliminary charge of molding material into each mold and a feed screw disposed in the said hopper.

9. In apparatus for molding blocks, the combination of means for advancing a series of molds, a feed hopper disposed above the said molds, a vertical feed screw adapted to receive material from the said hopper and force it downwardly into said molds, and a feed screw contained within the said hopper, the said hopper being provided with longitudinal slots for permitting a preliminary charge of molding material to fall into each mold as it approaches the said vertical feed screws.

10. In apparatus for molding blocks, the combination of two endless conveyers having parallel runs adapted to move in the same direction and at equal speeds, mold sections carried by the said conveyers and cooperating to form an endless series of molds, means for feeding plastic material into the said molds, and a stationary plate extending between the adjacent runs of said conveyers and forming a wall for said molds.

11. In apparatus for molding blocks, the combination of two endless conveyers having parallel runs adapted to move in the same direction and at equal speeds, mold sections carried by the said conveyers and cooperating to form an endless series of molds having openings formed therein, a stationary core member extending between the said conveyers and through said openings, means for feeding plastic material to the said molds, and a stationary plate extending between the adjacent runs of said conveyers and forming a wall for said mold.

12. In apparatus for molding blocks, the combination of a stationary base or table, two endless conveyers having parallel runs adapted to move on the same base in the same direction and at equal speeds, mold sections carried by the said conveyers and having coinciding openings, stationary side bars confining the said mold sections against outward movement, a stationary core bar extending between the adjacent runs of the said conveyers and through the said coinciding openings in the said mold sections, and a stationary plate extending between the adjacent runs of said conveyers and forming the bottoms of said molds.

13. In apparatus for molding blocks, the combination of two endless horizontal conveyers arranged side by side and carrying mold sections cooperating to form an endless series of molds, means for feeding molding material into said molds, a horizontal member extending between the adjacent runs of said conveyers and forming the bottoms of said molds, and an endless conveyer disposed in line with the said member and adapted to receive finished blocks successively from the said molds.

14. In apparatus for molding blocks, the combination of means for advancing a series of molds, cores disposed in said molds, means for introducing a partial charge of molding material into each of said molds, thereby causing said material to enter the portions of said molds beyond said cores, and means for thereafter filling the said molds with molding material and for compacting the material therein.

In testimony whereof, I, the said GEORGE C. DEBAY, have hereunto set my hand.

GEORGE C. DEBAY.

Witnesses:
ROBT. D. TOTTON,
JOHN F. WILL.